US010788835B2

(12) United States Patent
Hurd et al.

(10) Patent No.: US 10,788,835 B2
(45) Date of Patent: Sep. 29, 2020

(54) SAFETY SYSTEM FOR AUTONOMOUS OPERATION OF OFF-ROAD AND AGRICULTURAL VEHICLES USING MACHINE LEARNING FOR DETECTION AND IDENTIFICATION OF OBSTACLES

(71) Applicant: Raven Industries, Inc., Sioux Falls, SD (US)

(72) Inventors: Colin Josh Hurd, Ames, IA (US); Rahul Ramakrishnan, Ames, IA (US); Mark William Barglof, Burt, IA (US); Quincy Calvin Milloy, Ames, IA (US); Thomas Antony, Ames, IA (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

(21) Appl. No.: 16/188,114

(22) Filed: Nov. 12, 2018

(65) Prior Publication Data

US 2019/0146511 A1    May 16, 2019

Related U.S. Application Data

(60) Provisional application No. 62/585,170, filed on Nov. 13, 2017.

(51) Int. Cl.
*G05D 1/02* (2006.01)
*B60W 10/04* (2006.01)
(Continued)

(52) U.S. Cl.
CPC ........... *G05D 1/0214* (2013.01); *B60W 10/04* (2013.01); *B60W 10/10* (2013.01); *B60W 10/18* (2013.01);
(Continued)

(58) Field of Classification Search
CPC .. G05D 1/0214; G05D 1/0088; G05D 1/0246; G05D 2201/0201; G05D 1/0248;
(Continued)

(56) References Cited

U.S. PATENT DOCUMENTS

| 7,400,957 B2 * | 7/2008 | Hofer ................. | A01D 41/1278 172/2 |
| 2010/0013615 A1 * | 1/2010 | Hebert ............... | G06K 9/00805 340/425.5 |

(Continued)

FOREIGN PATENT DOCUMENTS

| CN | 102914967 B | 1/2015 |
| JP | 2944773 B2 | 9/1999 |

(Continued)

OTHER PUBLICATIONS

"International Application Serial No. PCT/US2018/060562, International Search Report dated Feb. 28, 2019", 3 pgs.

(Continued)

*Primary Examiner* — Nga X Nguyen
(74) *Attorney, Agent, or Firm* — Schwegman Lundberg & Woessner, P.A.

(57) ABSTRACT

A framework for safely operating autonomous machinery, such as vehicles and other heavy equipment, in an in-field or off-road environment, includes detecting, identifying, classifying and tracking objects and/or terrain characteristics from on-board sensors that capture images in front and around the autonomous machinery as it performs agricultural or other activities. The framework generates commands for navigational control of the autonomous machinery in response to perceived objects and terrain impacting safe operation. The framework processes image data and range data in multiple fields of view around the autonomous equipment to discern objects and terrain, and applies artificial intelligence techniques in one or more neural networks (Continued)

to accurately interpret this data for enabling such safe operation.

28 Claims, 4 Drawing Sheets

(51) Int. Cl.
| | |
|---|---|
| *B60W 10/10* | (2012.01) |
| *B60W 10/18* | (2012.01) |
| *B60W 10/20* | (2006.01) |
| *G05D 1/00* | (2006.01) |
| *G06K 9/00* | (2006.01) |
| *G06K 9/62* | (2006.01) |
| *G06N 99/00* | (2019.01) |
| *G06N 20/00* | (2019.01) |

(52) U.S. Cl.
CPC ........... *B60W 10/20* (2013.01); *G05D 1/0088* (2013.01); *G05D 1/0246* (2013.01); *G05D 1/0248* (2013.01); *G06K 9/00805* (2013.01); *G06K 9/6202* (2013.01); *G06K 9/6256* (2013.01); *G06K 9/6262* (2013.01); *G06K 9/6267* (2013.01); *G06K 9/6289* (2013.01); *G06N 20/00* (2019.01); *B60W 2300/15* (2013.01); *B60W 2420/42* (2013.01); *B60W 2554/00* (2020.02); *B60W 2710/10* (2013.01); *B60W 2710/18* (2013.01); *B60W 2710/20* (2013.01); *B60W 2720/106* (2013.01); *G05D 2201/0201* (2013.01)

(58) Field of Classification Search
CPC ...... G06N 20/00; B60W 10/20; B60W 10/18; B60W 10/04; B60W 10/10; B60W 2300/15; B60W 2420/42; B60W 2550/10; B60W 2710/10; B60W 2710/18; B60W 2720/106; B60W 2710/20; G06K 9/6202; G06K 9/6256; G06K 9/6262; G06K 9/6267; G06K 9/6289; G06K 9/00805

See application file for complete search history.

(56) References Cited

U.S. PATENT DOCUMENTS

| | | | |
|---|---|---|---|
| 2016/0375592 A1* | 12/2016 | Szatmary | ................... B25J 5/00 700/255 |
| 2017/0242442 A1* | 8/2017 | Minster | ................ G05D 1/0248 |
| 2018/0321683 A1* | 11/2018 | Foster | ................. G05D 1/0221 |

FOREIGN PATENT DOCUMENTS

| | | |
|---|---|---|
| WO | 2017103917 A1 | 6/2017 |
| WO | WO-2019094863 A1 | 5/2019 |

OTHER PUBLICATIONS

"International Application Serial No. PCT/US2018/060562, Written Opinion dated Feb. 28, 2019", 5 pgs.

* cited by examiner

SAFETY SYSTEM FOR AUTONOMOUS OPERATION OF OFF-ROAD AND AGRICULTURAL VEHICLES USING MACHINE LEARNING FOR DETECTION AND IDENTIFICATION OF OBSTACLES

CROSS-REFERENCE TO RELATED PATENT APPLICATION(S)

This patent application claims priority to U.S. provisional application 62/585,170, filed on Nov. 13, 2017, the contents of which are incorporated in their entirety herein. In accordance with 37 C.F.R. § 1.76, a claim of priority is included in an Application Data Sheet filed concurrently herewith.

FIELD OF THE INVENTION

The present invention relates to operation of autonomous or driverless vehicles in an off-road and/or in-field setting. Specifically, the present invention relates to a system and method that applies machine learning techniques to detect and identify objects and terrain in such an off-road or in-field setting, and enables autonomous or driverless vehicles to safely navigate through unpredictable operating conditions.

BACKGROUND OF THE INVENTION

Development and deployment of autonomous, driverless or unmanned vehicles and machinery have the potential to revolutionize transportation and industrial applications of such equipment. Autonomous vehicle technology is applicable for both automotive and agricultural uses, and in the farming industry it has great potential to increase the amount of land a farmer can work, and also significantly reduce costs. However, there are many nuances to application of autonomous vehicle technology in an agricultural setting that make usage of such vehicles and machinery much more difficult than in an automotive setting.

A major issue with this autonomous vehicle technology is safety, and providing user and public confidence in the operation of equipment. Safety systems currently in use or being developed for unmanned vehicles and machinery to-date are either specialized for automotive purposes or exceedingly expensive, and are not sufficiently accurate for full-scale deployment, particularly in the agricultural sector where specific issues require a very high level of confidence. For example, a safety system used with an autonomous tractor pulling a grain cart during a harvest must be able to quickly and accurately perceive obstacles such as people, other vehicles, fence rows, standing crop, terraces, holes, waterways, ditches, tile inlets, ponds, washouts, buildings, animals, boulders, trees, utility poles, and bales, and react accordingly to avoid mishaps. Each of these obstacles is challenging to identify with a high degree of accuracy.

Additionally, operating agricultural equipment and reacting accordingly where such obstacles have been detected and identified requires accurate on-board decision-making and responsive navigational control. However, agricultural equipment includes many different types of machines and vehicles, each with their own functions and implements for the various tasks for which they are intended to perform, and each having a different profile, size, weight, shape, wheel size, stopping distance, braking system, gears, turning radius etc. Each piece of machinery therefore has its own specific navigational nuances that make it difficult to implement a universal or standardized approach to safe autonomous operation that can apply to any piece of agricultural equipment.

Accordingly, there is a strong unmet need for a safety system that meets the substantial requirements of the agricultural marketplace and its unique operating environments.

BRIEF SUMMARY OF THE INVENTION

The present invention is a system and method for safely operating autonomous agricultural machinery, such as vehicles and other heavy equipment, in an in-field or off-road environment. This is provided in one or more frameworks or processes that implement various hardware and software components configured to detect, identify, classify and track objects and/or terrain around autonomous agricultural machinery as it operates, and generate signals and instructions for navigational control of the autonomous agricultural machinery in response to perceived objects and terrain impacting safe operation. The present invention incorporates processing of both image data and range data in multiple fields of view around the autonomous agricultural machinery to discern objects and terrain, and applies artificial intelligence techniques in one or more trained neural networks to accurately interpret this data for enabling such safe operation and navigational control in response to detections.

It is therefore one objective of the present invention to provide a system and method of ensuring safe autonomous operation of machinery and vehicles in an off-road and/or in-field environment. It is another objective of the present invention to provide a system and method of ensuring safe, reliable autonomous operation of machinery while performing agricultural tasks.

It is a further objective of the present invention to detect, identify, and classify obstacles and terrain, both in front of a vehicle and in a 360° field of view around an autonomously-operated machine. It is yet another objective of the present invention to provide a system and method that calculates and defines a trajectory of any objects detected in front of vehicle and in a 360° field of view around an autonomously-operated machine. It is still a further objective of the present invention to apply techniques of machine learning and artificial intelligence to detect, identify, and classify obstacles and terrain, and to train one or more neural networks or other artificial intelligence tools on objects and terrain to improve performance in further instantiations of such a safety framework.

It is still a further objective of the present invention to provide a safety system that perceives people, other vehicles, terrain, and other in-field objects as obstacles, and determine an operational state of autonomous field equipment in response thereto. It is yet another objective of the present invention to generate one or more signals for a navigation controller configured with autonomous field equipment for safe operation of such equipment when obstacles are detected, identified, and classified. It is another objective of the present invention to provide a safety system that is capable of being applied to any piece of agricultural machinery to enable its autonomous operation.

Other objects, embodiments, features, and advantages of the present invention will become apparent from the following description of the embodiments, which illustrate, by way of example, principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention, reference is made to the exemplary embodiments illustrating the principles of the present invention and how it is practiced. Other embodiments will be utilized to practice the present invention and structural and functional changes will be made thereto without departing from the scope of the present invention.

Figure 1:
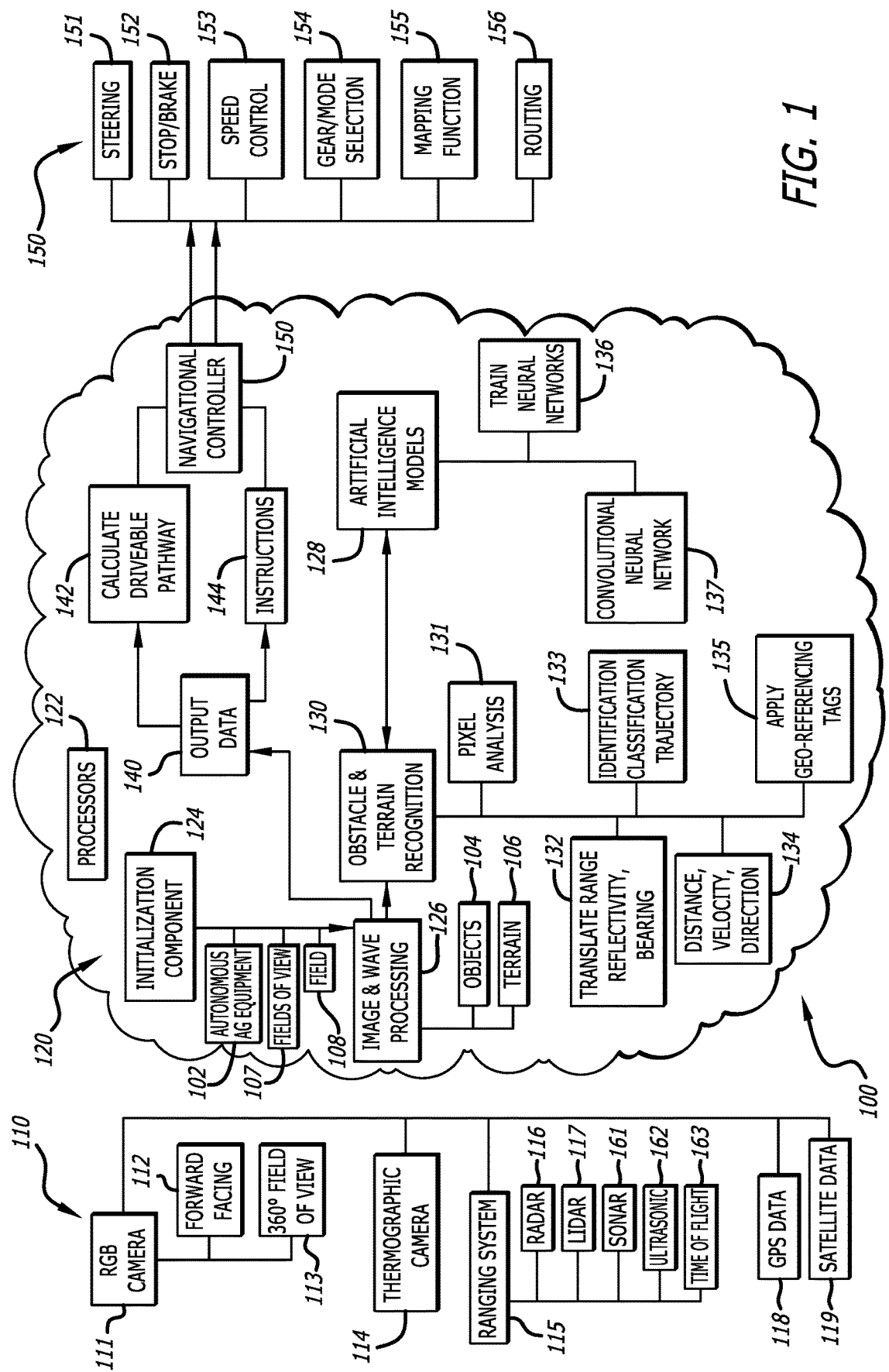
FIG. 1 is a system architecture diagram illustrating components in a safety framework for autonomous operation of agricultural equipment according to one embodiment of the present invention.

The present invention provides an approach for ensuring safe operation of autonomous agricultural machinery, such as driverless vehicles and other heavy equipment, in an in-field or off-road environment. FIG. 1 is a system architecture diagram for a safety framework 100 for ensuring reliable operation of autonomous agricultural machinery 102. The safety framework 100 is performed within, and is comprised of, one or more systems and/or methods that includes several components, each of which define distinct activities and functions required to process and analyze input data 110 from multiple types of sensors associated with such driverless vehicles and machinery, to recognize either or both of objects 104 or terrain characteristics 106 that may affect an operational state of the autonomous agricultural machinery 102. The safety system 100 generates output data 140 that is used, in one embodiment, to provide navigational control 150 for autonomous agricultural machinery 102, and provide one or more signals or commands for remote operation of such autonomous agricultural machinery 102 in a safe manner.

It is to be understood that the safety framework 100 may be utilized with any type of agricultural equipment, such as for example tractors, plows, combines, harvesters, tillers, grain carts, irrigation systems such as sprinklers and for any type of agricultural activity for which autonomous operation may be implemented. Therefore, the present specification and invention are not to be limited to any type of machine or activity specifically referenced herein. Similarly, the safety framework 100 may be utilized with any type of off-road vehicle or machine, regardless of the industrial or commercial application thereof.

The safety framework 100 performs these functions by ingesting, retrieving, requesting, receiving, acquiring or otherwise obtaining input data 110 from multiple sensors that have been configured and initialized to observe one or more fields of view 107 around autonomous agricultural machinery 102 as it operates in a field 108. As noted further herein, many types of sensors may be utilized, and input data 110 may be collected from either on-board sensing systems or from one or more external of third-party sources.

The input data 110 includes images collected from at least one RGB (3-color) camera 111, which may further include a camera 112 configured for a forward-facing field of view 104, and a camera or system of cameras 113 configured for a 360° degree field of view 107 around the autonomous agricultural machinery 102. The input data 110 also includes images collected from a thermographic camera 114. Each of these cameras 112, 113 and 114 may have different fields of view 107, at different distances relative to the autonomous agricultural machinery 102. Input data 110 obtained from cameras 111 may be in either raw or processed form, and therefore on-board sensing systems may include algorithms and hardware configured to process camera images for the safety framework 100.

The input data 110 also includes information obtained from reflected signals from radio or other waves obtained from one or more ranging systems 115. Many different types of ranging systems 115 are contemplated, and may include ground penetrating radar 116, LiDAR 117, sonar 161, ultrasonic 162, time of flight 163, and any other ranging systems capable of analyzing a field of view 107 around autonomous agricultural machinery 102. Each of these ranging systems 115 emits waves in a defined field of view 107 relative to the autonomous agricultural machinery 102, and signals reflected back are utilized to identify spatial attributes of any obstacles in the field of view 107. As with input data 110 obtained from cameras 111, information from ranging systems 115 may be in either raw or processed form, such that on-board sensors may include algorithms and hardware capable of processing such input data 110 for follow-on usage.

Input data 110 may also include GPS data 118 that enables the safety framework 100 to correlate known obstacles with those that are detected, identified, classified and tracked in the present invention. Such GPS data 118 enables GPS receivers to determine positional coordinates and/or boundaries of obstacles and terrain, as well as boundaries of the field 108 itself within which the autonomous agricultural machinery 102 is being operated. This allows the safety framework 100 to apply one or more georeferencing tags to mark known obstacles or terrain for the one or more artificial intelligence models 128, described further herein, used to determine what objects 104 and terrain characteristics 106 are within the field of view 107 for the multiple sensors providing input data 110.

Many other types of input data 110 are also possible for use with the safety framework 100. For example, images 119 captured by satellite systems may also be included, and this may be used correlate known obstacles and terrain characteristics with those that are detected, identified, classified and tracked in the present invention. For example, if a body of water is captured in satellite image data 119 in a particular field 108 in which the autonomous agricultural machinery 102 is operating, information about this terrain characteristic 106 may be stored with data known to a trained neural network used to detect, identify, and classify such a terrain characteristic 106, as well as to confirm its presence in the field 108 when the multiple sensors capture pixel and spatial data that matches information representing this body of water.

The input data 110 is applied to a plurality of data processing modules 121 within a computing environment 120 that also includes one or more processors 122 and a plurality of software and hardware components. The one or more processors 122 and plurality of software and hardware components are configured to execute program instructions or routines to perform the functions of the safety framework 100 described herein, and embodied by the plurality of data processing modules 121.

The plurality of data processing modules 121 in computing environment 120 include a data initialization component 124, which is configured to initiate collection of input data 110 from the multiple sensors and perform the ingest, retrieval, request, reception, acquisition or obtaining of input data 110. The initialization component 124 may also be utilized to configure the fields of view 107 of each sensor collecting input data 110, as fields of view 107 may be definable based on characteristics such as weather conditions being experienced or expected in the field in which autonomous agricultural machinery 102 is operating, the type and configuration of machinery being operated, knowledge of particular obstacles or terrain therein, and any other localized or specific operating conditions that may impact each field of view 107 and the operation of the autonomous agricultural machinery 102.

The plurality of data processing modules 121 may also include an image and wave processing component 126, which analyzes the input data 110 to perform obstacle and terrain recognition 130. This is performed by analyzing images captured by the multiple cameras 112, 113 and 114, and by analyzing reflected signals from radio or other waves emitted by the ranging system(s) 115. The image and wave processing component 126 performs a pixel analysis 131 on images from the multiple cameras 112, 113 and 114, by looking for pixel attributes representing shape, brightness, color, edges, and groupings, (and other pixel attributes, such as variations in pixel intensity across an image, and across RGB channels) that resemble known image characteristics of objects for which the one or more neural networks 137 have been trained. The image and wave processing component 126 also translates spatial attributes such range, range-rate, reflectivity and bearing 132 from the reflected signals from radio or other waves emitted by the ranging system(s) 115, to calculate distance, velocity and direction of the objects identified from the input data 110. This information is used to perform an identification and classification 133 of the objects 104 and terrain 106, as well as the movement and trajectory of objects 106. Geo-referencing tags 135 may also be applied to correlate objects 104 and terrain 106 with known items from GPS data 118 or from prior instantiations of the use of neural networks 137 and/or other artificial intelligence models 128 to perform the obstacle and terrain recognition 130, or to mark positions of objects 104 and terrain characteristics 106 identified as the autonomous agricultural machinery 102 performs it activities.

It should be noted that the processing of input data 110, and the execution of navigational control navigational control that is responsive to obstacle and terrain recognition 130, occurs in real-time. It is therefore to be understood that there is no (or negligible) latency in the performance of the safety framework 100 and the various data processing functions described herein.

The safety framework 100 includes, as noted above, one or more layers of artificial intelligence models 128 that are applied to assist the image and wave processing component 126 in obstacle and terrain recognition 130. The artificial intelligence portion of the present invention includes, and trains, one or more convolutional neural networks 137 which identify, classify and track objects 104 and terrain characteristics 106.

Use of artificial intelligence 128 operates in the safety framework 100 by applying the input data 110 to the one or more neural networks 137, which receive camera data and ranging data in their various formats through input layers, and then processes that incoming information through a plurality of hidden layers. The one or more neural networks 137 look for pixel attributes representing shape, brightness and groupings that resemble image characteristics for which they were trained on, and once a match is identified, the one or more neural networks 137 output what has been identified, together with a probability. For example, where a truck drives into the RGB camera's field of view 107, the one or more neural networks 137 may generate data in the form of (Truck)(90%). Applying such an approach to obstacle detection with a probability allows for simple filtering of false positives once baseline accuracy is known. Using a pre-trained neural network(s) 137, the safety framework 100 can evaluate sensor data and provide a relatively quick solution to begin training itself further.

The image and wave processing component 126 produces output data 140 that is indicative of whether an object 104 or terrain characteristic 106 has been recognized that requires changing or altering the operational state of autonomous agricultural machinery 102, or some other instruction 144 or command thereto. The output data 140 may be used to calculate a drivable pathway 142 given the object 104 or terrain characteristic 106 recognized, and this information (or other instruction 144 or command) may be provided to the autonomous agricultural machinery 102 to effect navigational control 150 as the equipment moves through its intended setting. This may include a command for steering control 151, a stop or brake command 152, a speed control command 153, and gear or mode selection 154.

Additionally, output data 140 may be provided as an input to perform path planning, by extrapolating the position of the detected object 104 or terrain characteristic 106 in a mapping function 155, and calculating a new route 156 to avoid such obstacles. In such a path planning embodiment, output data 140 may be georeferencing data, together with a trigger, and the command for navigational control 150 is to re-plan a new route 156, or the new route 156 itself. Also, a command or data for a mapping function 155 itself may also be provided. For example, depending on the type of object 104 or terrain characteristic 106 detected, the obstacle may be updated either temporarily or permanently, until the obstacle is in the field of view 107. In such an example, a static object 104 such as a pole, or non-traversable terrain 106, may produce an update to the mapping function 155, and the terrain characteristic 106 may be marked as an exclusion or no-go zone. Similarly, a dynamic object 104 such as a person may require only a temporary update to the mapping function 155.

Regardless, is to be understood that many other commands for navigational control derived from the output data 140 are also possible and within the scope of the present invention, and therefore this disclosure is not to be limited to any instruction 144 or command specifically delineated herein.

A calculated drivable pathway 142 may take many factors into account, and use other types of input data 110, to respond to detected and identified objects 104 and terrain characteristics 106, and provide signals for a navigational controller 150 to take action to ensure safety in the present invention. For example, the safety framework 100 may evaluate GPS data 118 to continually identify a position and a heading of the autonomous agricultural machinery 102 as it operates through a field 108. Additionally, path planning in calculating a drivable pathway and navigational control in response thereto may take into account operational characteristics of the particular equipment in use, such as its physical dimensions and the type of nature of implements configured thereon, as well as the turning radius, current speed, weather conditions, etc. Further, as noted herein, outer and inner field boundaries (and positional coordinates thereof) that for example define exclusion zones and other field limitations must also be accounted for.

The safety framework 100 of the present invention uses a plurality of sensors so that an object 104 and terrain 106 may be identified and located using more than one source, both to improve accuracy and to account for operating conditions where reliability of sources may be impaired. As one skilled in the art will readily appreciate, environmental factors may affect the ability of the safety framework 100 to identify and locate an object 104 and terrain 106, as images and reflected radio or other signals in the fields of view 107 may not be sufficient for the neural network(s) 137 to properly perform. For example, when a level of light is relatively low, an RGB camera 111 may not generate enough data to allow a neural network 137 to identify an object photographed by that sensor. Similarly, in settings where the environment and the objects within it have substantially the same temperature, a neural network 137 utilizing data from thermographic camera 114 may not be able to identify an object. However, the combination of an RGB camera 111 and a thermographic camera 114 greatly improves the ability for the safety framework 100 to accurately detect, identify and classify an object 104. For example, where autonomous agricultural machinery 102 utilizing the safety framework 1000 is deployed at night, and an object 104 is in the field of view 107 of the RGB camera 111 and the thermographic camera 114, the neural networks 137 may be unable to identify or classify the object 104 based on data obtained from the RGB camera 111. However, the thermographic camera 114 may provide enough information to allow the neural network(s) 137 to detect the presence of the object 104 and then further classify it.

Similarly, if the safety framework 100 is deployed in a relatively warm light environment, for example, a farm field on a warm summer day, the thermographic camera 114 may not be able to generate enough data for the neural network 137 to identify an object 104 within its field of view 107. However, if there is enough light in such an operational setting, an identification may be made from the data collected by the RGB camera 111.

Navigational control 150 of the autonomous agricultural machinery 102 may depend vary based on multiple factors, such as for example the type of the identified object 104 or terrain characteristic 106, and the distance the object 104 or terrain characteristic 106 is from the autonomous agricultural machinery 102, and its movement. For example, the object 104 may be identified as a person 50 feet away. In response, the autonomous agricultural machinery 102 may slow its speed in order to give the person an opportunity to avoid the vehicle. If the person does not move, the autonomous agricultural machinery 102 may slow to a lower (or predetermined) speed, by either braking or lowering to selected gear, as the autonomous agricultural machinery 102 approaches the person, or may turn to follow an alternate pathway in the event it is determined the person has not moved. The autonomous agricultural machinery 102 may also be instructed to stop if the person has not moved from the approaching autonomous agricultural machinery 102, and may also be configured to emit a loud noise to warn the person of an approaching vehicle. In the alternative, if the object 104 is identified as a coyote, the autonomous agricultural machinery 102 may simply progress without changing its course or speed, or emit a warning sound or high-frequency signal. As yet another alternative, if the object 104 cannot be sufficiently identified, the navigational controller 150 may stop the autonomous agricultural machinery 102 and contact the operator to alert the operator of the object 104, and allow for a non-autonomous determination of a course of action that should be taken. In this latter embodiment, the navigational controller 150 may cause a digital image of the obstacle taken by a camera to be sent wirelessly to the operator for further analysis.

It is to be understood that the plurality of sensors that capture input data 110 may be both configured on-board autonomous agricultural machinery 102, so as to collect input data 110 as the autonomous agricultural machinery 102 operates, or otherwise associated with such autonomous agricultural machinery 102 so that sensors need not be physically coupled to such machinery 102. For example, where the safety framework 100 of the present invention includes satellite data 119 in its processing, such data 119 may be ingested, received, acquired, or otherwise obtained from third party of external sources. Additionally, it is also contemplated and within the scope of the present invention that the safety framework 100 may utilize data 110 collected by other vehicles, driverless or otherwise, operating in the same field as the autonomous agricultural machinery 102, either at the same time or at other relevant temporal instances. For example, one piece of machinery may capture a body of water present in a field at a prior time period on the same day, and this may be used by the present invention to make a determination of whether an object 104 or terrain 106 later identified requires a change in operational state or navigational control.

As noted above, machine learning is used in the safety framework 100 to associate and compare information in the various types of input data 110 and identify attributes in such input data 110 to produce identification and classification of objects 104 and terrain characteristics 106, and to track movement of objects 104. This information is ultimately used to generate output data 140, which enables the safety framework 100 to calculate a drivable pathway 142 for the autonomous agricultural machinery 102 and generate instructions 144 for navigational control 150 thereof. As part of the processing performed in the safety framework 100, the one or more neural networks 137 may be configured to develop relationships among and between the various types of input data 110 to perform the correlations and matching used to formulate obstacle and terrain recognition 130, which is used to determine whether the safety framework 100 needs to take action to manipulate and control the autonomous agricultural machinery 102 in response to the unexpected presence of an object 104 or unknown terrain characteristic 106.

The present invention contemplates that temporal and spatial attributes in the various types of input data 110 may be identified and developed in such a combined analysis by training the one or more layers of artificial intelligence 128 to continually analyze input data 110, to build a comprehensive dataset that can be used to make far-reaching improvements to how objects 104 and terrain 106 are determined as autonomous agricultural machinery 102 operates in a field 108. For instance, the one or more layers of artificial intelligence 128 can be applied to an adequately-sized dataset to draw automatic associations and identify attributes in pixels, effectively yielding a customized model for that can identify commonly-encountered objects or terrain in a particular field. As more and more data are accumulated, the information can be sub-sampled, the one or more neural networks 137 retrained, and the results tested against independent data representing known objects and terrain, in an effort to further improve obstacle and terrain recognition 130 in the safety framework 100. Further, this information may be used to identify which factors are particularly important or unimportant in associating temporal and spatial attributes and other characteristics when identifying and classifying objects and terrain, and tracking movement of objects, thus helping to improve the accuracy and speed of the safety framework 100 over time.

The present invention contemplates that many different types of artificial intelligence may be employed within the scope thereof, and therefore, the artificial intelligence component 128 and models comprised thereof may include one or more of such types of artificial intelligence. The artificial intelligence component 128 may apply techniques that include, but are not limited to, k-nearest neighbor (KNN), logistic regression, support vector machines or networks (SVM), and one or more neural networks 137 as noted above. It is to be further understood that any type of neural network 137 may be used, and the safety framework 100 is not to be limited to any one type of neural network 137 specifically referred to herein. Regardless, the use of artificial intelligence in the safety framework 100 of the present invention enhances the utility of obstacle and terrain recognition 130 by automatically and heuristically identifying pixel attributes such as shapes, brightness and groupings, using mathematical relationships or other means for constructing relationships between data points in information obtained from cameras 111 and 114, and ranging systems 115, to accurately identify, classify and track objects 104 and terrain 106, where applicable. For example, where pixel characteristics known to be related to a particular object or terrain characteristic are known and analyzed with the actual objects/terrain in real-world situations, artificial intelligence techniques 128 are used to 'train' or construct a neural network 137 that relates the more readily-available pixel characteristics to the ultimate outcomes, without any specific a priori knowledge as to the form of those attributes.

The neural network(s) 137 in the present invention may be comprised of a convolutional neural network (CNN). Other types of neural networks are also contemplated, such as a fully convolutional neural network (FCN), or a Recurrent Neural Network (RNN), and are within the scope of the present invention. Regardless, the present invention applies neural networks 137 that are capable of utilizing image data collected from a camera 111 or thermal imaging device 114 to identify an object 104 or terrain 106. Such neural networks 137 are easily trained to recognize people, vehicles, animals, buildings, signs, etc. Neural networks are well known in the art and many commercial versions are available to the public. It is to be understood that the present invention is not to be limited to any particular neural network referred to herein.

Figure 2:
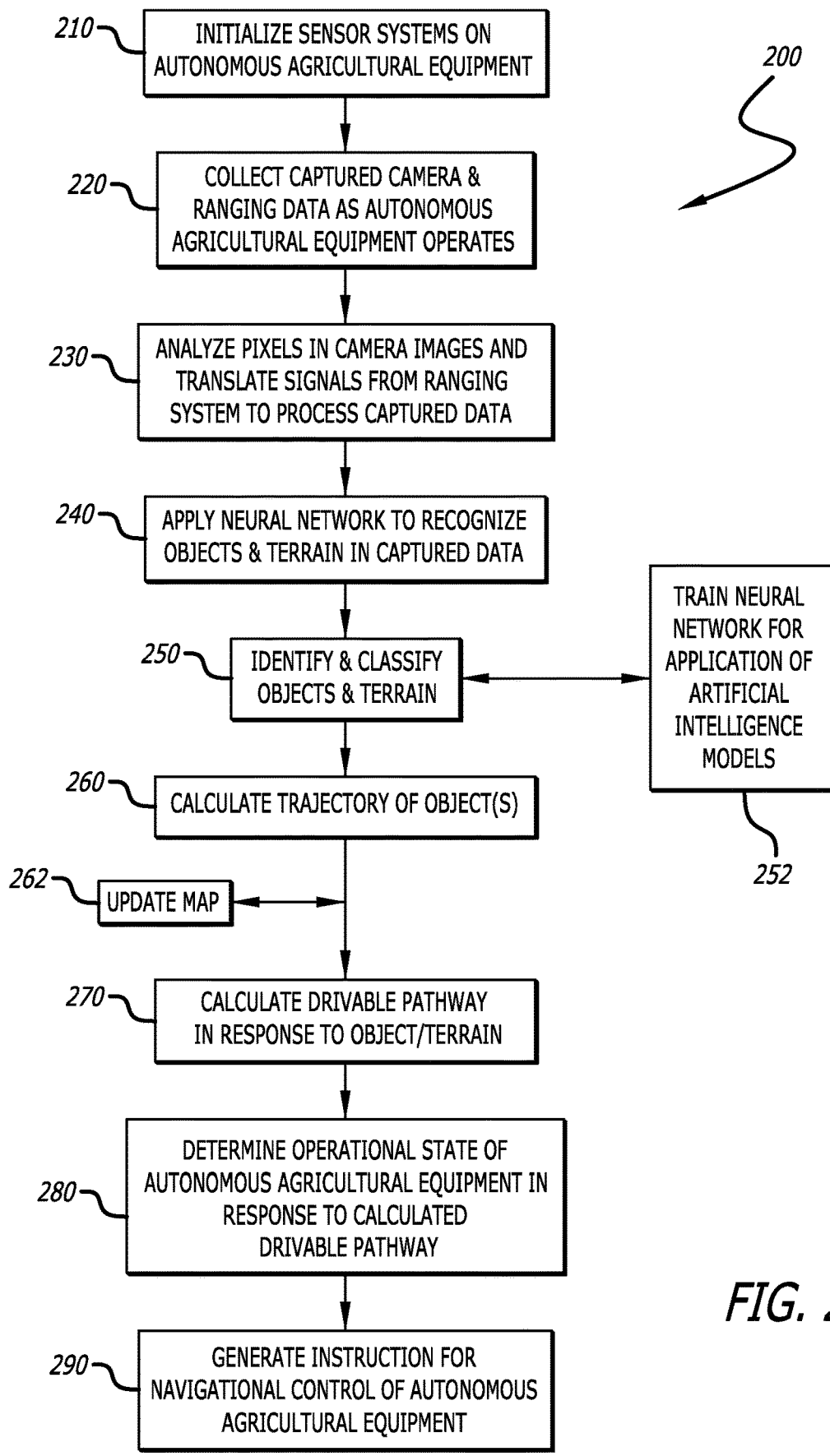
FIG. 2 is a flowchart of steps in a process for implementing the safety framework for autonomous operation of agricultural equipment according to one embodiment of the present invention.

FIG. 2 is a flowchart illustrating a process 200 for performing the safety framework 100 of the present invention. The process 200 begins at step 210 by initializing sensor systems on, or associated with, autonomous agricultural machinery 102, for example where agricultural applications in performing field activities are commenced using driverless vehicles and equipment. The sensor systems at step 210 are activated and begin the process of continually observing the defined fields of view 107, and at step 220 this input data 110 from cameras 111 and 114 and ranging systems 115 is collected as autonomous agricultural machinery 102 operates in a selected environment. At step 230, the process 200 analyzes pixels from images captured by the cameras 111 and 114, and translates signals reflected from waves emitted by the ranging systems 115.

At step 240, the process 200 applies one or more trained neural networks 137 to perform recognition 130 of objects 104 and terrain characteristics 106 as described in detail above. At step 250, the one or more neural networks 137 identify and classify certain objects 104 and terrain 106 in camera images, as well as determine spatial attributes such as distance and position to locate objects 104 and terrain 106, and to determine movement at least in terms of velocity and direction to track objects 106 from both image and ranging data. The neural networks 137 are also constantly being trained to "learn" how to discern and distinguish items encountered by the autonomous agricultural machinery 102 as input data 110 is collected and as objects 104 and terrain 106 are recognized, characterized, and confirmed, at step 252. At step 260, the present invention calculates a trajectory of the objects 104 to further characterize the object 104 and help determine the operational state of the autonomous agricultural machinery 102 in response thereto. At steps 250, 252, and 260 therefore, the process 200 continually trains one or more artificial intelligence models to improve identification of images obtained using cameras 111 and 114 and ranging systems 115, and improving the ability to perform depth relation and track directional movement and speed, and other identification and location characterizations, that help to accurately determine objects 104 and terrain 106 in a field. As noted above, many types of outputs are possible from the safety framework 100. In one such possible output, in step 260, the process 200 may perform an update to a mapping function 155 once obstacles such as objects 104 and terrain characteristics 106 have been detected, identified and classified.

At step 270, the process 200 applies the information obtained regarding any objects 104 or terrain characteristics 106, and calculates a drivable pathway to reach an intended waypoint or endpoint that acknowledges the in-field obstacle. At step 280, the process then determines whether an operational state of the autonomous agricultural machinery 102 must be altered in response to the calculated drivable pathway 142. This may include determining whether an object 104 or terrain characteristic 106 is an in-field obstacle that requires an adjustment of the path or operation of the autonomous agricultural machinery 102. For example, and as noted above, a drivable pathway around a coyote may be calculated, but the safety framework 100 may determine to proceed along the current pathway, with or without an adjustment to some operational state such as increasing or decreasing speed.

At step 290, the process 200 generates output data 140 that may include instructions to control navigation of the autonomous agricultural equipment in response to the calculated drivable pathway, and/or otherwise in response to a change the operational state of the autonomous agricultural equipment, where an object 104 or terrain characteristic 106 requires than an action be taken.

It is to be understood that autonomous operation of vehicles and machinery for agricultural applications or in other field/off-road environments requires extensive configuration for safe and accurate performance, such as field setup and location mapping to ready the various hardware and software elements associated with agricultural equipment for driverless activity. This may include defining field boundaries and one or more way or destination points that serve as positions in a field where such vehicles and machinery are required to operate to perform autonomous agricultural tasks. One aspect of ensuring accurate and safe performance in autonomous operation of vehicles and machinery in agricultural applications is the usage of boundaries and other way paints as a safety mechanism, and the present invention includes software configured such that the autonomous agricultural machinery 102 may only operate within the pre-established boundaries of the field 108. For example, an outer boundary may be ported into a controller platform on board the autonomous agricultural machinery 102, either from another "precision" agricultural device, or created by a user from satellite imagery 119. If the autonomous agricultural machinery 102 projects an autonomous waypoint path such that any point along the waypoint path is outside of a pre-set boundary, the autonomous agricultural machinery 102 will issue a warning to the operator and will fail to start. Internal boundaries can also be created as operation of the autonomous agricultural machinery 102 progresses by a user such as the combine operator. Inner boundaries then become exclusion zones that the autonomous agricultural machinery 102 is to avoid. In this manner, calculation of a drivable pathway 142 in the present invention takes into account pre-set as well as in-operation boundaries and waypoints, such as field boundaries and inner boundaries defining exclusion zones to be avoided, in addition to objects 104 and other terrain characteristics 106 requiring changes in operational states such as steering 151, stopping and braking 152, increasing or decreasing speed 153, gear/mode selection 154, and other manipulations.

Figure 3:
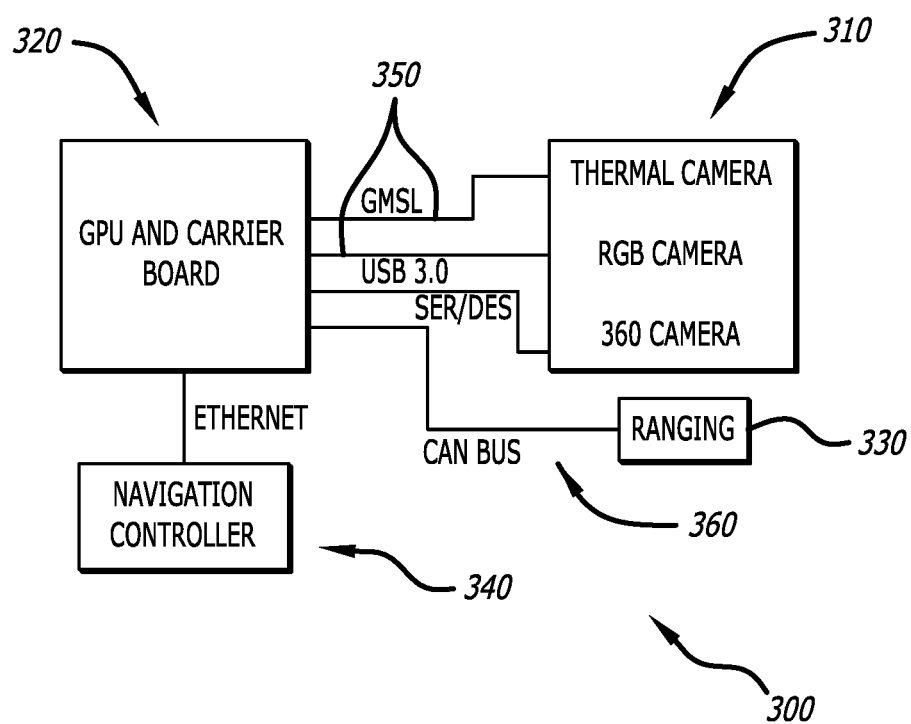
FIG. 3 is a general block diagram of hardware components in the safety framework for autonomous operation of agricultural equipment according to one embodiment of the present invention.

FIG. 3 is a generalized block diagram of an exemplary hardware configuration 300 for the safety framework 100 for autonomous operation of agricultural machinery 102. The exemplary hardware configuration 300 includes a plurality of sensors 310 and 330, which as discussed herein may include a forward-facing RGB camera 112, a camera or camera systems configured for a 360° view 113, and a thermographic camera 114. Sensors 330 may include a ranging system 115, such as ground penetrating radar 116 or any other kind of range or radar system, as noted above.

The exemplary hardware configuration 300 also includes an on-board controller 320 that has a graphics processing unit (GPU) and a carrier board implementing such a GPU, and a navigational controller 340. The on-board controller 320 may include and utilize one or more software components performing algorithms that filter and fuse sensor data, and apply techniques of artificial intelligence to analyze such sensor data to perform the image and wave processing described herein. The navigational controller 340 may similar include and utilize one or more software components performing algorithms that enable navigation of the agricultural equipment as it operates in its intended setting for the performance of autonomous tasks and activities.

Several input/output (I/O) configurations provide connectivity between these elements, such as a serial CAN (Controller Area Network) bus 360 which may be utilized to connect the ranging sensor 330 to the on-board controller 320 and provide power thereto, and one or more physical/wired connections 350 such as Gigabit Multimedia Serial Link (GMSL), USB 3.0, and a serializer/de-serializer (Ser-Des) that connect the camera sensors 310 to the on-board controller (and also provide power thereto). It is to be understood however than many types of configurations, either wired or wireless, are possible for connecting the plurality of sensors configured on autonomous agricultural machinery 102 to the controller(s) thereon, and are within the scope of the present invention, and the safety framework 100 is therefore not intended to be limited to any one configuration shown or described herein. Similarly, Ethernet, Wi-Fi or Bluetooth® (or another means of connectivity) may be utilized to link the on-board controller 320 with the navigational controller 340, and therefore it is to be understood that such a connection may also be either wired or wireless and may take any form that enables such elements to effectively communicate information.

In one exemplary physical embodiment, the GPR sensing unit 330 is mounted on the front of a vehicle above a weight rack, and connected to the GPU with a CAN bus cable which also provides power to the range/radar components. The thermal, RGB and 360-degree cameras 310 are mounted below and in front of the vehicle cab's centralized GPS mounting location to provide the best field of view 107 for the cameras 111 and 114. These imaging sensors 310 are powered via physical connections 350, such as for example USB 3.0, GMSL, and Ser/Des to the GPU processor 320. The GPU processor 320 itself may be mounted next to the navigation controller 340 and interfaced over Ethernet, Wi-Fi or Bluetooth® as noted above.

Figure 4:
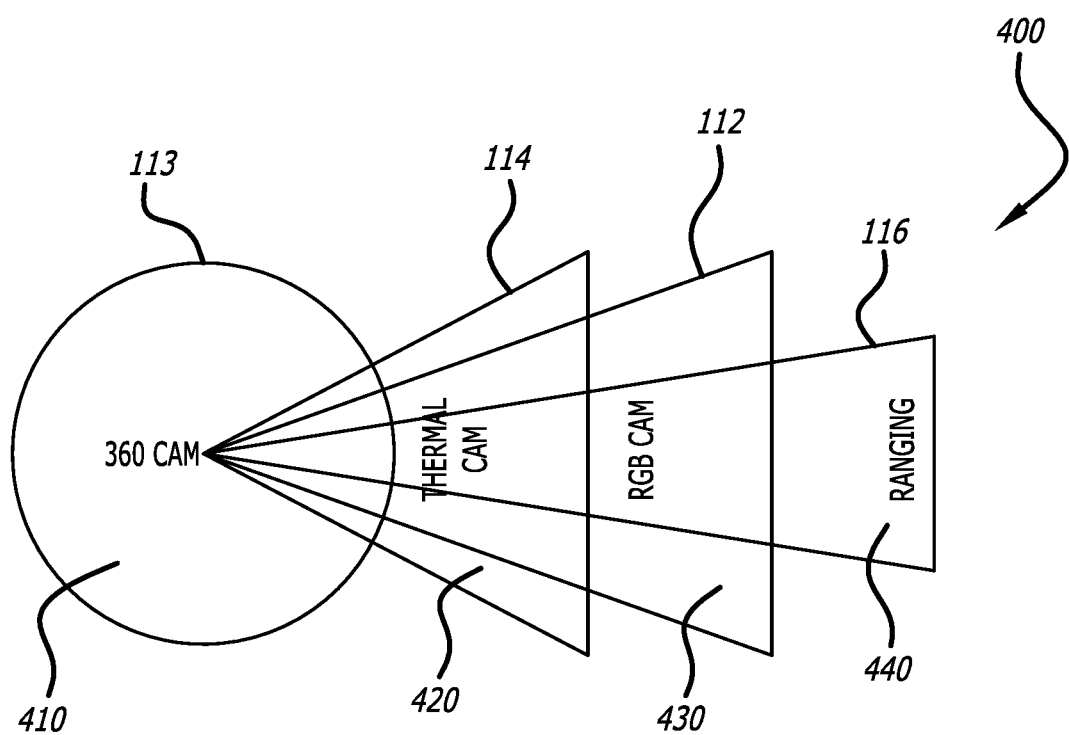
FIG. 4 is an illustration of exemplary fields of view of components capturing input data in the safety framework for autonomous operation of agricultural equipment according to one embodiment of the present invention.

FIG. 4 is an illustration 400 of exemplary fields of view 107 for sensor components capturing input data 110 in the present invention. These fields of view 107 may be customizable by owners or operators of autonomous agricultural machinery 102, for example using a remote support tool as noted further herein. Fields of view 107 may be changeable for many different reasons, such as for example the intended use of the agricultural machinery 102, the type of machinery 102 on which they are mounted, for various weather conditions, and for operational limitations of the sensors themselves.

In the illustration 400 of FIG. 4, each of the sensors 410, 420, 430 and 440 have different fields of view 107 and each provide a distinctive view of the area around autonomous agricultural machinery 102 the collectively represent a comprehensive ability to detect objects 104 or terrain 106. For example, the 360° camera 410 has a field of view 113 that extends in a radius around the autonomous agricultural machinery 102 (not shown), allowing the camera 410 to see all around the driverless vehicle. This enables detection of obstacles in a 360° area near or beside a driverless machine, at a range 50% greater than the width of the machine itself. The thermographic camera 420 has a field of view 114, extending in a forward-facing configuration to capture thermal images further than that of the 360° camera's capabilities. Another RGB camera 430 has a field of view 112 that extends even further in forward-facing direction beyond that of the other two cameras. Finally, the ranging system 440 has field of view 116 that is narrower but longer than that of the other sensing systems. Together, the fields of view 107 in FIG. 4 are able to detect obstacles at a range of at least 100 meters in front of the autonomous agricultural machinery 102.

The safety framework 100 may also include a remote stop system that utilizes a mesh network topology to communicate between emergency stop devices and the autonomous agricultural machinery 102, either in conjunction with an output from the navigational controller 150 or separately in response to a recognized object 104 or terrain characteristic 106. The remote stop system is integrated into the driverless vehicle's control interface device, and when activated, broadcasts a multicast emergency stop message throughout the distributed mesh network. The mesh radio integrated into the vehicle's control interface device receives the message and when received, initiates the emergency stop procedure. The emergency stop procedure is performed outside the application layer and works at the physical layer of the interface device. This serves as a redundant safety protocol that assures that if a catastrophic software defect occurs in the autonomous vehicle application, the safety stop procedure can still be performed. The mesh network topology allows for messages to hop from one line of sight device to another allowing for a message to hop across the topology to reach non-line-of-sight nodes in the network. This acts to not only provide a way for everyone to stop the autonomous vehicle in the field, but also works to increase the node density of the network and increase the remote stop range and bandwidth.

The present invention may also include a support tool that is configured to allow access for configuration of the plurality of sensors, fields of view 107, and navigational decision-making in response to recognition 130 of objects 104 and terrain characteristics 106 in the safety framework 100 of the present invention.

The support tool may also enable a user to input and/or select operational variables for conducting operations with the autonomous agricultural machinery 102 that are related to ensuring its safe and accurate job performance. For example, operational field boundaries can be input or selected, as well as attributes (such as GPS coordinates and, boundaries, and sizes) of field conditions, such as the presence of objects 104 or terrain characteristics 106, that are already known to the user.

The support tool may further include a function enabling a user override that overrides automatic navigational control of the autonomous agricultural machinery 102. Such a user override allows a user to instruct the safety framework 100 to ignore a detected object 104 or terrain characteristic 106 and proceed with performance of the autonomous agricultural activity. The support tool may further be configured to generate recommendations, maps, or reports as output data, such as for example a report describing navigational actions taken in response to objects 104 or terrain 106 detected, types of objects 104 and terrain characteristics 106 detected, and locations within a particular field 108 of interest.

The support tool may be configured for visual representation to users, for example on a graphical user interface, and users may be able to configure settings for, and view various aspects of, safety framework 100 using a display on such graphical user interfaces, and/or via web-based or application-based modules. Tools and pull-down menus on such a display (or in web-based or application-based modules) may also be provided to customize the sensors providing the input data 110, as well as to modify the fields of view 107. In addition to desktop, laptop, and mainframe computing systems, users may access the support tool using applications resident on mobile telephony, tablet, or wearable computing devices.

The systems and methods of the present invention may be implemented in many different computing environments. For example, the safety framework 100 may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method, comprising:
    initializing input data collected from a plurality of sensors mounted on autonomous off-road machinery performing one or more agricultural activities in a field, the plurality of sensors including a ranging system, and a plurality of cameras configured to capture images, in multiple fields of view from the autonomous off-road machinery;
    analyzing the input data within a computing environment in one or more data processing modules executed in conjunction with at least one specifically-configured processor, the one or more data processing modules configured to recognize objects and terrain characteristics around the autonomous off-road machinery, by
        analyzing one or more attributes of pixels in images captured by the plurality of cameras, and analyzing one or more attributes captured from signals reflected from waves communicated by the ranging system, to detect both a presence and a location of the objects and terrain characteristics in the multiple fields of view,
        applying one or more neural networks to identify and classify the objects and terrain characteristics in the multiple fields of view, by matching image characteristics that resemble one or more of pixel shapes, pixel brightness and pixel groupings used to train the one or more neural networks,
        tracking movement of objects identified and classified by the one or more neural networks, to determine one or more of distance, direction, and velocity of the objects, by matching spatial attributes that are similar to characteristics of objects used to train the one or more neural networks, and
        calculating a drivable pathway in response to the presence and location of the objects and terrain characteristics in the multiple fields of view, and movement of the objects; and
    generating one or more instructions to control navigation of the autonomous off-road machinery in a performance of the one or more agricultural activities in the field in response to the drivable pathway.

2. The method of claim 1, wherein the generating one or more instructions to control navigation of the autonomous off-road machinery in a performance of the one or more agricultural activities in the field in response to the drivable pathway further comprises generating one or more commands to change an operational state of the autonomous off-road machinery.

3. The method of claim 2, wherein the change in operational state includes one or more of steering, stopping, braking, increasing speed, decreasing speed, selecting one or more gears, shifting the one or more gears, and selecting an operational mode of the autonomous off-road machinery.

4. The method of claim 1, wherein the drivable pathway is responsive to heading and position data of the autonomous off-road machinery, and to operational characteristics that include one or more of turning radius capability, implemented attachments, and intended usage of the autonomous off-road machinery.

5. The method of claim 1, further comprising applying geo-referencing techniques to tag a position of each of the objects and terrain characteristic identified and classified.

6. The method of claim 1, further comprising evaluating GPS data to continually identify a position and a heading of the autonomous off-road machinery.

7. The method of claim 1, wherein the plurality of cameras configured to capture images in multiple fields of view around the autonomous off-road machinery include one or more of a thermographic camera, a forward-facing camera and a camera configured for a 360-degree field of view.

8. The method of claim 1, wherein the analyzing one or more attributes of pixels further comprises identifying pixel attributes that include at least one of shape, color, brightness, edges and groupings to calculate image characteristics representing the objects and terrain characteristics in the multiple fields of view.

9. The method of claim 1, wherein the analyzing one or more attributes captured from signals reflected from waves communicated by the ranging system further comprises evaluating range, reflectivity, and bearing data to calculate an object's spatial attributes in the multiple fields of view.

10. The method of claim 1, further comprising continually training the one or more neural networks with pixel attributes of shapes in objects and terrain characteristics identified and classified, and with spatial attributes of objects tracked.

11. A system, comprising:
    a computing environment including at least one non-transitory computer-readable storage medium having program instructions stored therein and a computer processor operable to execute the program instructions within one or more data processing modules configured to recognize objects and terrain characteristics around autonomous agricultural machinery performing one or more agricultural activities in a field, the one or more data processing modules including:
    a data collection component configured to initialize input data collected from a plurality of sensors mounted on the autonomous agricultural machinery, the plurality of sensors including a ranging system, and a plurality of cameras configured to capture images, in multiple fields of view from the autonomous agricultural machinery;
    an image and wave processing component configured to analyze one or more attributes of pixels in images captured by the plurality of cameras, and analyzing one or more attributes captured from signals reflected from waves communicated by the ranging system, to detect both a presence and a location of the objects and terrain characteristics in the multiple fields of view;
    an artificial intelligence component configured to identify and classify the objects and terrain characteristics in the multiple fields of view, by matching image characteristics that resemble one or more of pixel shapes, pixel colors, pixel brightness, pixel edges, and pixel groupings used to train the one or more neural networks, and estimate a trajectory of an object identified and classified to determine one or more of distance, direction, and velocity of the objects, by matching spatial attributes that are similar to characteristics of objects used to train the one or more neural networks;

an output data component configured to calculate a drivable pathway in response to the presence of the objects and terrain characteristics in the multiple fields of view; and a navigational control component configured to generate one or more instructions for actuating the autonomous agricultural machinery for a performance of the one or more agricultural activities in the field in response to the drivable pathway.

12. The system of claim 11, wherein the navigational control component generates one or more commands to change an operational state of the autonomous agricultural machinery.

13. The system of claim 12, wherein the change in operational state includes one or more of steering, stopping, braking, increasing speed, decreasing speed, selecting one or more gears, shifting the one or more gears, and selecting an operational mode of the autonomous agricultural machinery.

14. The system of claim 11, wherein the drivable pathway is responsive to heading and position data of the autonomous agricultural machinery, and to operational characteristics that include one or more of turning radius capability, implemented attachments, and intended usage of the autonomous off-road machinery.

15. The system of claim 11, wherein the image and wave processing component applies geo-referencing techniques to tag a position of each of the objects and terrain characteristic identified and classified.

16. The system of claim 11, further comprising a component configured to evaluate GPS data to continually identify a position and a heading of the autonomous agricultural machinery.

17. The system of claim 11, wherein the plurality of cameras configured to capture images in multiple fields of view around the autonomous agricultural machinery include one or more of a thermographic camera, a forward-facing camera and a camera configured for a 360-degree field of view.

18. The system of claim 11, wherein the image and wave processing component is further configured to analyze one or more attributes of pixels by identifying pixel attributes that include at least one of shape, color, brightness, edges and groupings to calculate image characteristics representing the objects and terrain characteristics in the multiple fields of view.

19. The system of claim 11, wherein the image and wave processing component is further configured to analyze one or more attributes captured from signals reflected from waves communicated by the ranging system by evaluating range, reflectivity, and bearing data to calculate an object's spatial attributes in the multiple fields of view.

20. The system of claim 11, wherein the artificial intelligence component is further configured to continually train the one or more neural networks with pixel attributes of shapes in objects and terrain characteristics identified and classified, and with spatial attributes of objects tracked.

21. A method for ensuring safe operation of autonomous agricultural machinery, comprising:

analyzing input data collected from a plurality of sensors mounted on autonomous agricultural machinery in performing one or more agricultural activities in a field, the plurality of sensors including a ranging system, and a plurality of cameras configured to capture images, in multiple fields of view from the autonomous agricultural machinery;

analyzing one or more attributes of pixels in images captured by the plurality of cameras, and analyzing one or more attributes captured from signals reflected from waves communicated by the ranging system, to detect both a presence and a location of objects and terrain characteristics in the multiple fields of view;

matching image characteristics that resemble one or more of pixel shapes, pixel colors, pixel brightness, pixel edges, and pixel groupings in one or more trained neural networks to identify and classify the objects and terrain characteristics in the multiple fields of view;

matching spatial attributes that are similar to characteristics of objects used to train the one or more neural networks to calculate a trajectory of the object identified and classified by the trained one or more neural networks from one or more of distance, direction, and velocity of the objects;

calculating a drivable pathway in response to the presence of the objects and terrain characteristics in the multiple fields of view;

determining a change in an operational state of the autonomous agricultural machinery to accommodate the drivable pathway; and controlling navigation of the autonomous agricultural machinery in a performance of the one or more agricultural activities in the field in response to the drivable pathway and to effect the change in operational state, by generating commands to perform one or more of steering, stopping, braking, increasing speed, decreasing speed, selecting one or more gears, shifting the one or more gears, and selecting an operational mode of the autonomous agricultural machinery.

22. The method of claim 21, wherein the drivable pathway is responsive to heading and position data of the autonomous agricultural machinery, and to operational characteristics that include one or more of turning radius capability, implemented attachments, and intended usage of the autonomous agricultural machinery.

23. The method of claim 21, further comprising applying geo-referencing techniques to tag a position of each of the objects and terrain characteristic identified and classified.

24. The method of claim 21, further comprising evaluating GPS data to continually identify a position and a heading of the autonomous agricultural machinery.

25. The method of claim 21, wherein the plurality of cameras configured to capture images in multiple fields of view around the autonomous agricultural machinery include one or more of a thermographic camera, a forward-facing camera and a camera configured for a 360-degree field of view.

26. The method of claim 11, wherein the analyzing one or more attributes of pixels further comprises identifying pixel attributes that include at least one of shape, color, brightness, edges and groupings to calculate image characteristics representing the objects and terrain characteristics in the multiple fields of view.

27. The method of claim 21, wherein the analyzing one or more attributes captured from signals reflected from waves communicated by the ranging system further comprises evaluating range, reflectivity, and bearing data to calculate an object's spatial attributes in the multiple fields of view.

28. The method of claim 1, further comprising continually training the one or more neural networks with pixel attributes of shapes in objects and terrain characteristics identified and classified, and with spatial attributes of objects tracked.

\* \* \* \* \*